United States Patent
Davis et al.

[11] Patent Number: 5,828,966
[45] Date of Patent: Oct. 27, 1998

[54] UNIVERSAL CHARGING CRADLE FOR CORDLESS TELEPHONES

[76] Inventors: Russell Davis, 391 Rolph St., San Francisco, Calif. 94112; Paul Eric Peterson, 1 Chaves St., San Francisco, Calif. 94127; William Leung, 138 Brunswick St., San Francisco, Calif. 94112

[21] Appl. No.: 652,820

[22] Filed: May 23, 1996

[51] Int. Cl.$^6$ ............ H04Q 7/00; H01M 10/44; H04M 1/00
[52] U.S. Cl. ............ 455/573; 455/90; 320/115; 379/446; 379/455
[58] Field of Search ............ 455/573, 90, 462, 455/550, 403, 572, 571; 320/115, 113, 110, 107, 114; 379/426, 428, 433, 434, 438, 440, 441, 447, 449, 450, 453, 454, 455; D14/142, 145, 251, 253, 240, 140

[56] References Cited

U.S. PATENT DOCUMENTS

| | | | |
|---|---|---|---|
| 4,634,810 | 1/1987 | Grassl et al. | 379/61 |
| 5,138,351 | 8/1992 | Wiegand et al. | 354/81 |
| 5,151,643 | 9/1992 | Emmert et al. | 320/2 |
| 5,157,318 | 10/1992 | Wang | 320/110 |
| 5,280,229 | 1/1994 | Faude et al. | 320/110 |
| 5,357,185 | 10/1994 | Chen | 320/110 |
| 5,365,159 | 11/1994 | Chen | 320/113 |
| 5,371,784 | 12/1994 | Yankura | 379/61 |
| 5,372,514 | 12/1994 | Odemer et al. | 439/136 |
| 5,519,776 | 5/1996 | Kodama | 379/428 |
| 5,656,914 | 8/1997 | Nagele et al. | 320/110 |
| 5,679,017 | 10/1997 | Smith | 439/172 |
| 5,686,808 | 11/1997 | Lutz | 320/110 |

*Primary Examiner*—William Cumming
*Assistant Examiner*—Tracy M. Legree
*Attorney, Agent, or Firm*—Feix & Feix; Tom Hamill

[57] ABSTRACT

A charging cradle for recharging cordless telephones which is modular and configurable in a variety of ways is provided. The cradle includes a charging unit and interchangeable telephone support structure. The charging cradle has at least two interchangeable support elements, one of which includes recharging elements. The support elements are removably attachable to support struts and may be attached in any order. The support struts are in electrical communication with the charging unit. The recharging support element includes electrical communication elements which connect the charging unit with the recharging contacts located on the external surface of the telephone handset. The charging cradle is adapted to hold the telephone handset in a nested relation while recharging the batteries located within the handset. Safety features prevent overcharging. The charging cradle may be constructed in such a manner to permit the recharging of most cordless portable telephones.

19 Claims, 9 Drawing Sheets

UNIVERSAL CHARGING CRADLE FOR CORDLESS TELEPHONES

BACKGROUND OF THE INVENTION

1. Field of the Invention

The present invention relates generally to charging devices to recharge cordless telephones, and more particularly, to a configurable charging cradle for a cordless phone especially adapted to permit the recharging of most cordless telephones no matter where the recharging elements are located on the external surface of the telephone.

2. Brief Description of the Prior Art

The use of cordless telephones is becoming increasing popular worldwide. As a result, cordless phones come in many sizes and shapes, and are commercially available from a variety of manufacturers. Currently, the trend is to produce cordless phones which are smaller and lighter. The handset of the cordless phones include a battery unit, which must be recharged at a certain frequency to guarantee uninterrupted service. As such, separate charging units are provided with the telephones.

Currently, static, trough-like charging cradles are employed with charging terminals configured for the location and number of recharging terminals located on the external surface of the handset of the cordless telephone. The handset is placed in the charging cradle when not in use, and the batteries are recharged. However, current charging cradles can only accommodate handsets with external recharging terminals which come in contact with the charging terminals of the cradle. Most handsets use two terminals for charging, while other popular phones use three terminals. Recharging terminals are sometimes located on the bottom of the handset, although they reside on the front, top and side, as well as in the interchangeable battery pack of other handsets. Each cordless telephone charging cradle is configured to receive and recharge the handset it was specifically designed to recharge. The charging system electronics on cordless phones also vary from manufacturer to manufacturer. The polarity of the charging terminals and the charging voltage and current may also be variable. It is not possible to easily recharge a handset of a cordless telephone on a cradle which was not specifically designed to receive and recharge that handset.

In order to facilitate the recharging of the cordless phone, the phone must be brought into contact with its charging cradle. As cordless phones are often transported between one location and another this is not always possible. Accordingly, there is a definite need in the art for a cordless phone recharging cradle which is universal, that is, may be easily configured to meet the charging needs of a plurality of phones, no matter where the recharging contacts are located on the surface of the handset. Other advantages of the present invention over the prior art also will be rendered evident.

SUMMARY OF THE INVENTION

To achieve the foregoing and other advantages, the present invention, briefly described, provides a charging cradle for recharging cordless telephones which is modular and configurable in a variety of ways. The cradle includes a charging unit and interchangeable telephone support structure. The charging cradle has at least two interchangeable support elements, one of which includes recharging elements. The support elements are removably attachable to support struts and may be attached in any order. The support struts are in electrical communication with the charging unit. The recharging support element includes electrical communication means which connect the charging unit with the recharging contacts located on the external surface of the telephone. Other structure may be provided to firmly hold the handset in the cradle. The charging cradle is adapted to hold the telephone in a nested relation while recharging the batteries located within the telephone. Safety features prevent overcharging. The charging cradle may be readily changed to a plurality of configurations and thus would permit the recharging of most cordless portable telephones.

The charging cradle's base will house the electrical charging system. The design of the charging cradle will be such to permit the recharging of many different locations of charging terminals on the handset. The cradle will be adaptable to supporting many different handset shapes and sizes, without the modification of the handset. The cradle will further insure consistent and positive phone positioning while being charged. Different embodiments of the cradle may include posts with electrical contacts located on one end. These posts would be "plugged" into the cradle and the electrical contacts will be brought into contact with the corresponding recharging structure located on the handset.

The universal charging cradle is adjustable mechanically. The charging terminal (contact) position on the cradle is adjustable in order to accommodate the differences in location of charging elements on different makes and models of cordless phone handsets. Because of the large variation in charging element position from one telephone handset to another, it will be necessary for the user to perform a one-time setup of the cradle to position the charging terminal (contact) in the appropriate location to facilitate the charging of the particular handset. This assembly of the charging cradle is simple and non-time consuming. Once the final assembly is confirmed and proper the configuration may be locked in place. If a new phone is purchased, or a recharge of another style handset is desired, the cradle may be easily reset to a new configuration.

The universal charging cradle is adjustable electrically. The cradle will provide an appropriate charging current to the handset, to recharge the batteries which are located therein. This current may be AC or DC, depending on specific battery recharging requirements. It has the ability to accommodate the entire range of voltages encountered in rechargeable battery packs. The electrical source will be provided at low voltages, of about 3 to 10 volts, and at low currents, of about 10 to 200 milliamperes. Most commercially available phones would be well supported by a stand-by/trickle-charge mode, preferably in the range of about 25 to 50 milliamperes. Electrical power will be delivered to the handset via two electrical contacts (charging terminals) located on the charging cradle. It has been found that handsets with three electrical charging elements may be recharged utilizing the AC or DC applied to the two contacts.

Many commercially available telephones include diode bridges between the electrical charging elements located on the handset and the internal battery pack. This permits the charging with AC or DC sources. It also permits DC charging without concerns of electrode polarity. Selection of AC or DC sources will be made depending on a detailed review of commercial telephones, manufacturing cost and circuit performance/versatility.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new universal charging cradle which is adaptable to recharge a variety of cordless telephones, no matter where the external charging elements are located on the handset.

It is another object of the present invention to provide a new universal charging cradle which has interchangeable components which facilitate bringing the charging elements in the charging cradle into contact with the external charging elements located on the cordless telephone handset.

It is a further objective of the present invention to provide a new universal charging cradle which is of durable and reliable construction.

An even further object of the present invention is to provide a new universal charging cradle which is susceptible of a low cost of manufacture with regard to both materials and labor, and which accordingly is then susceptible of low prices of sale to the consuming public, thereby making such a universal charging cradle available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated the preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new universal charging cradle for cordless telephones embodying the principles and concepts of the present invention will be described.

Figure 1:
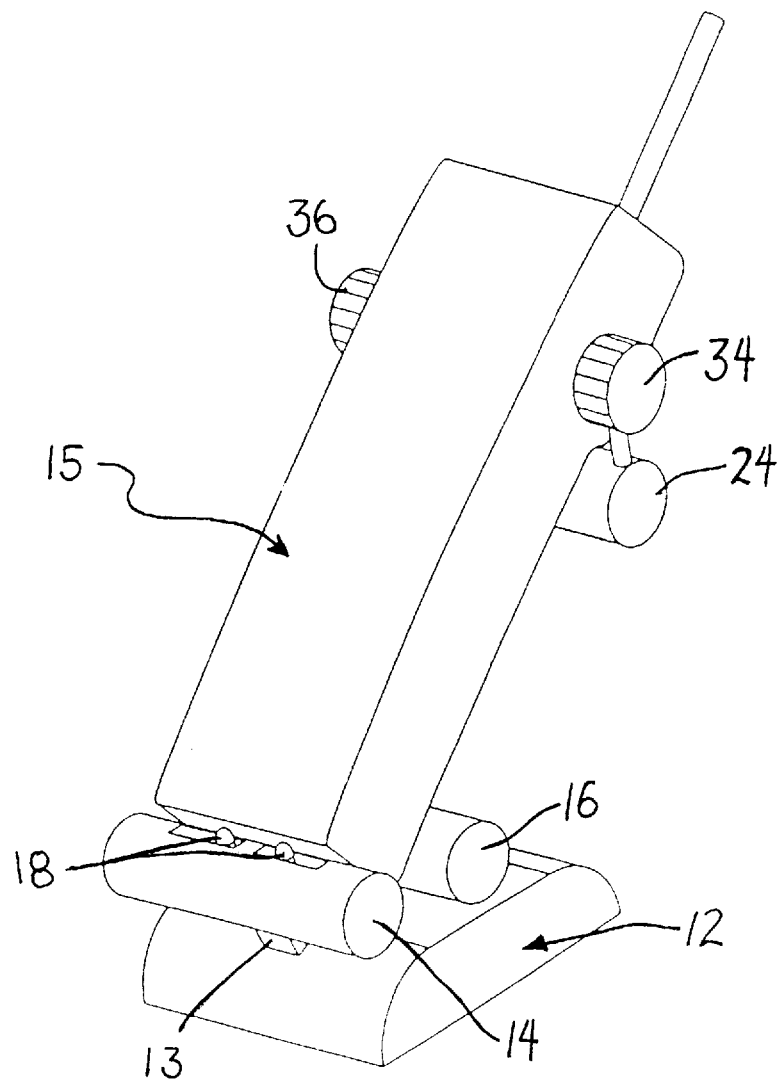
FIG. 1 is a perspective view showing the telephone charging cradle in a first configuration, with the handset resting in the cradle.
Figure 2:
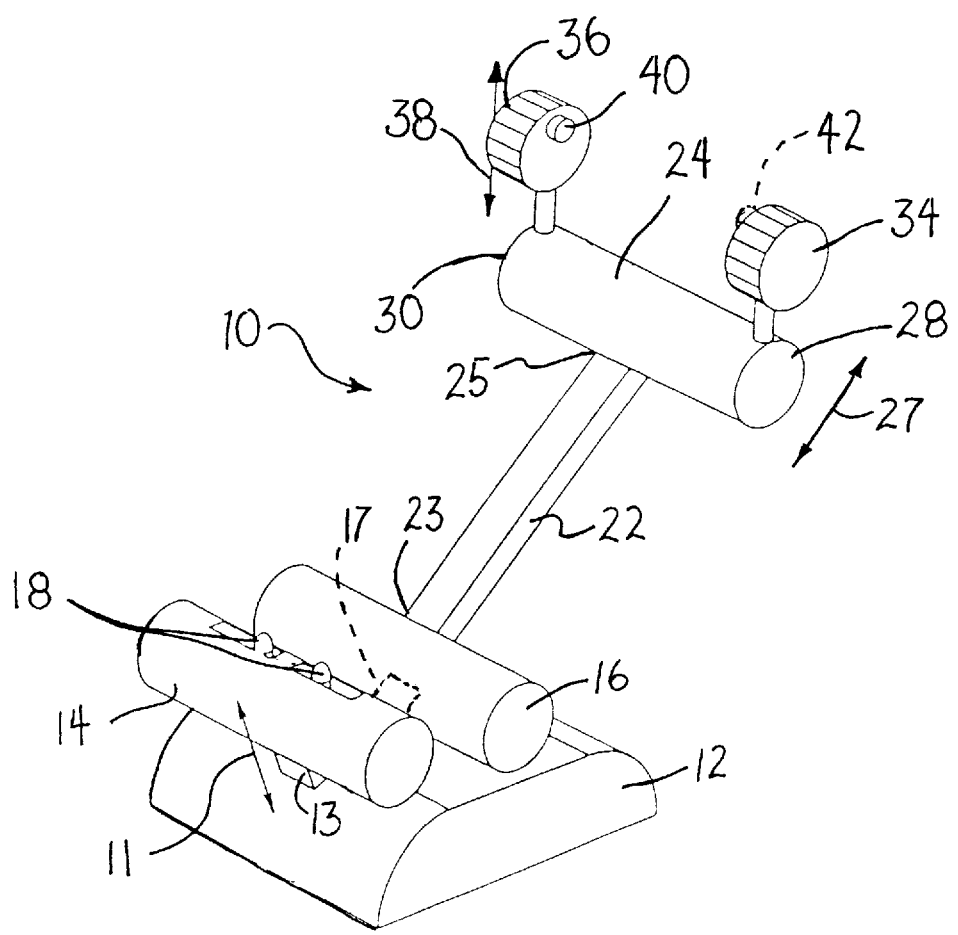
FIG. 2 is a perspective view of the telephone charging cradle in a first configuration.

Turning initially to FIGS. 1 and 2, there is shown the charging cradle of the invention generally designated by reference numeral 10. A cordless telephone handset 15 is held in the charging cradle 10. The charging cradle 10 is in a first configuration for recharging handsets having recharging electrodes located on the bottom of the handset 15. A base housing 12, which houses the charging electronics, will be placed on any convenient surface. Depending from the base housing 12 is a first attachment element 13 which has a first support element 14 attached thereto. The first support element 14 is removably attachable to the first attachment element 13 as indicated by arrow 11. A first pair of electrical contacts 18 are located on the first support element 14. The first pair of electrical contacts 18 are in communication with the charging means located in the housing 12 through electrical communication means located in and through the first attachment element 13 and the first support element 14. A second support element 16 is attached to the base housing 12 by a second attachment element 17. The second support element 16 further receives elongated rod element 22. Elongated rod element 22 has a proximal end 23 and a distal end 25. A third support element 24 is connected to the distal end 25 of elongated element 22. The third support element 24 may be removably attached to the distal end 25 as indicated by arrow 27. The third support element 24 has a right side 28 and a left side 30. A right side centering pad 34 extends from the right side 28 of the third support element 24. A left side centering pad 36 extends from the left side 30 of the third support element 24. The centering pads (34, 36) help positively secure the handset in the charging cradle 10. The centering pads (34, 36) may be removably attached to the third support element 24 as indicated by arrow 38. Right centering pad 34 may further include a right centering pad charging contact 42. Left centering pad may further include a left centering pad charging contact 40. The centering pad charging contacts (40, 42) would be employed to recharge handsets with recharging electrodes located on the right and left side of the handset 15. The centering pad charging contacts (40, 42), if employed, will be in communication with the charging means located in the housing 12 through electrical communication means located in and through the second attachment element 17, the second support element 16, the elongated rod element 22 and the third support element 24. The electrical communication means of each component will matingly engage the corresponding electrical communication means at each connection element by known electrical connection means.

Figure 3:
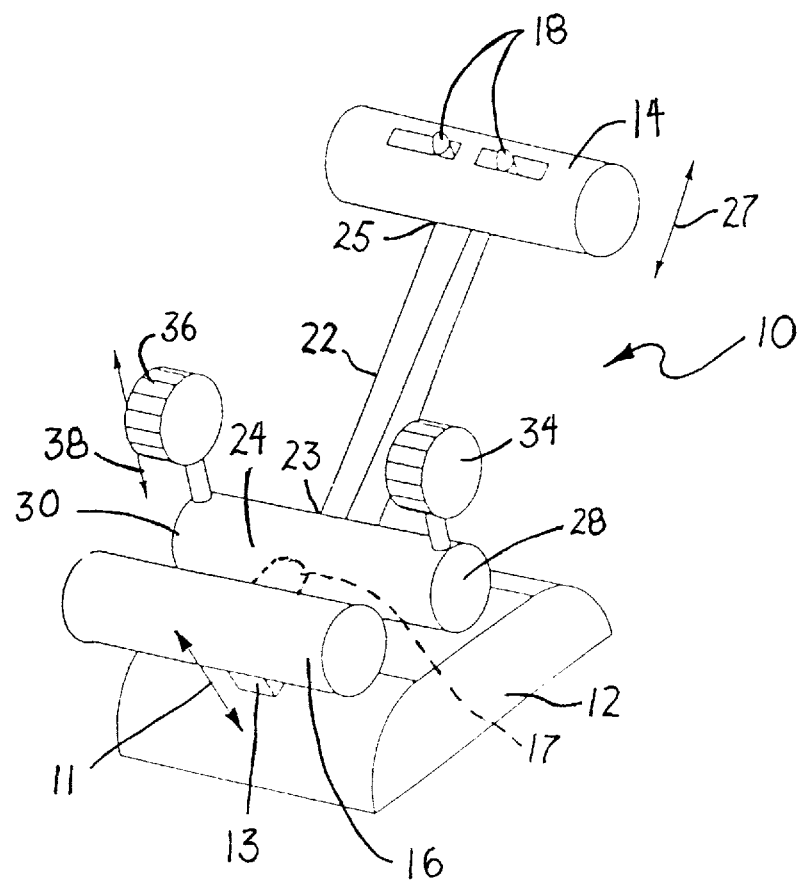
FIG. 3 is a perspective view of the telephone charging cradle in a second configuration.

Referring now specifically to FIG. 3, the charging cradle 10 has had the support elements (14,16, 24) rearranged to support the recharging of a telephone handset having recharging electrodes located on the top of the handset 15. The first support element 14 has been attached to the distal end 25 of the elongated rod element 22. The third support element 24 has been attached to the second attachment element 17. The third support element 24 has also been attached to the proximal end 23 of elongated rod element 22. The centering pads (34,36) are once again removably attached to the right side 28 and left side 30 of the third support element 24 as indicated by arrow 38. The second support element 16 has been attached to the first attachment element 13. The first pair of electrical charging contacts 18 will be in communication with the charging means located in the housing 12 through electrical communication means located in and through the second attachment element 17, the third support element 24 and the elongated rod element 22. In this configuration, the first support element 14 is removably attachable to the distal end 25 of the elongated rod element 22 as indicated by arrow 27. The second support element 16 is removable attachable to first attachment element 13. By the rearrangement of the first, second and third support elements (14, 16, 24) the cradle 10 has a different appearance and supports the recharging of a handset with recharging elements located at the top of the handset. Once again, the centering pads (34,36) positively secure the handset in the cradle 10.

Figure 4:
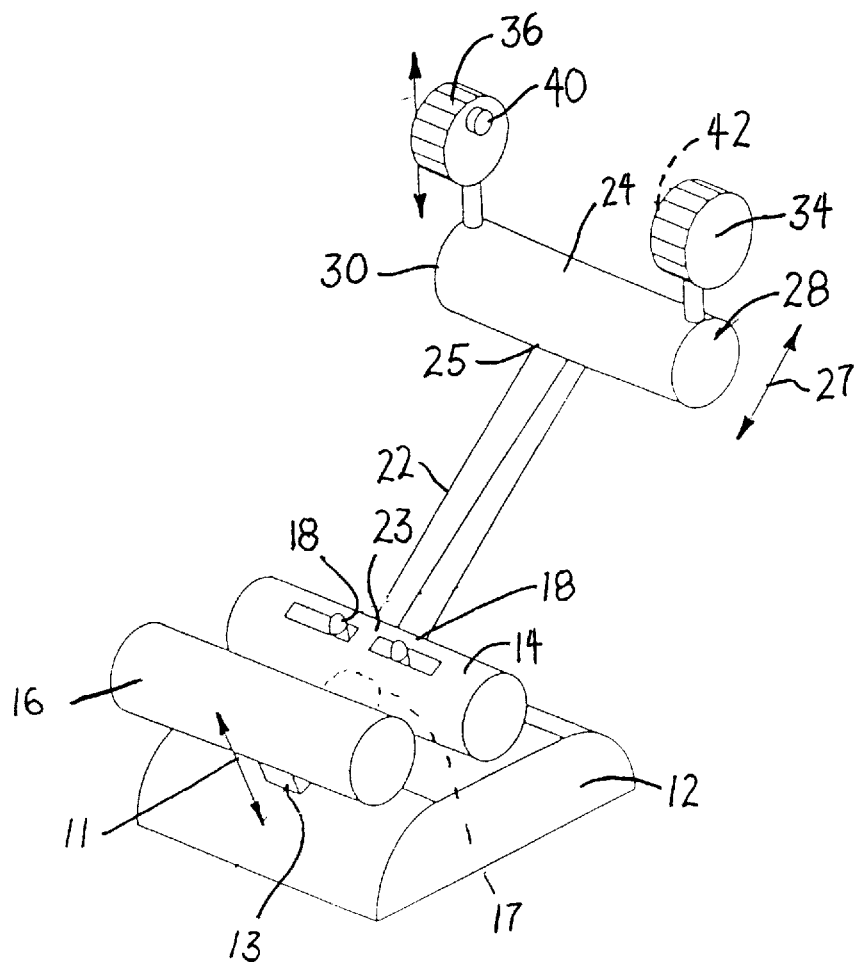
FIG. 4 is a perspective view of the telephone charging cradle in a third configuration.

FIG. 4 shows yet another possible configuration of the charging cradle 10. In this configuration, the first support element 14 is attached to the second attachment element 17, and the third support element 24 is attached to the distal end 25 of the elongated rod element 22. This supports the recharging of a telephone handset having recharging electrodes located on the bottom of the handset, but located more toward the front of the bottom of the handset 15.

Another variation or embodiment of the handset may be provided. Essentially, the elongated rod element 22 may have its proximal end 23 "plugged into" the back rear portion of the base 12. The first support element 14, second support element 16, and third support element 24 would be completely interchangeable and adapted to be placed on the first attachment element 13, the second attachment element 17, and the distal end 25 of what is essentially the third attachment element. The second attachment element 17 would be intermediate the first attachment element 13 and the elongated rod 22. In this version, the elongated rod 22 may be reversed, that is, have its proximal end 23 receive a support element and the distal end 25 be "plugged into" the back rear portion of the base 12. This would save having a second socket to be placed on the support elements for interchangeableness of the same.

The detachably removable elements of the construction include electrical communication means. In a preferred embodiment, the elements snap fit together with positive electrical connection means such as male pins being received in female sockets. Mechanically, the snap fit will have male portions being positively received in female sockets, with the connection being secured by ball and spring detent connections. It is appreciated that other electrical and mechanical securing, attachment and communication means are known and would be obvious to one of ordinary skill to employ such means in the instant invention.

Figure 5:
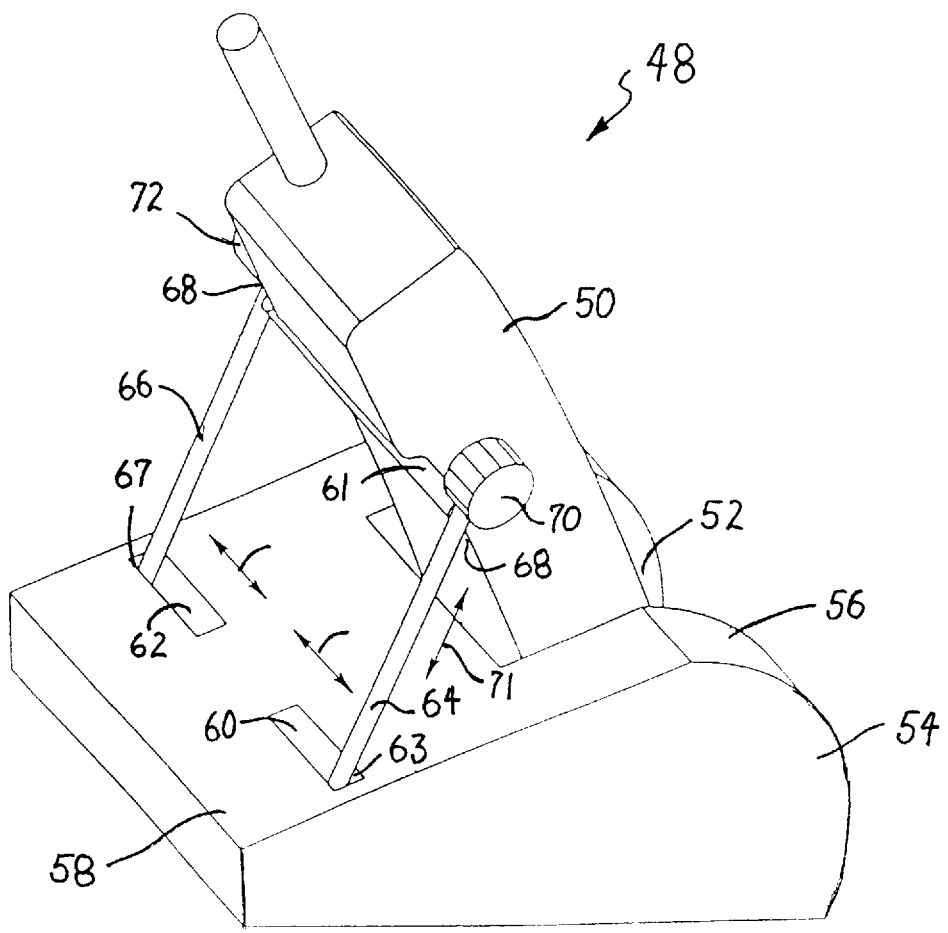
FIG. 5 is a perspective view of a second embodiment of the telephone charging cradle.

FIG. 5 shows an alternative embodiment of the invention. A cordless telephone handset 50 is received in a central aperture 52 located on the front portion of the base housing 54 of the charging cradle 48. The base housing 54 houses the charging electronics and may be placed on any convenient surface. The base housing 54 has a front portion 56 and a rear portion 58. The central aperture 52 includes electrical contacts to recharge the handset 50. The electrical contacts are in communication with the charging electronics. The electrical contacts will be located in such a position where they will come into contact with handset recharging electrodes. The rear portion 58 includes a right slot 60 and a left hand slot 62. At the bottom of the right slot 60 and the left slot 62 are electrical communication means with the charging electronics. Right slot 60 is designed to receive right rod 64. Left slot 62 is designed to receive left rod 66. Right rod 64 includes a proximal end 63 and a distal end 65. Left rod 66 also includes a proximal end 67 and a distal end 68. Right rod 64 is connected to left rod 66 by a horizontal support rod 61. The horizontal support rod 61 both bolsters the right and left rod, as well as forms a surface for the handset 50 to lay upon while undergoing charging in the cradle 48. A right centering pad 70 is attached to the right rod 64 distal end 65. A left centering pad 72 is attached to the left rod 66 distal end 68. The centering pads (70, 72) may include electrical contacts to support the recharging of handsets with side handset recharging electrodes. The right and left rods (64, 66) are detachably removable as indicated by arrow 71. The right and left rods (64,66) may also be adjustable in a right and left fashion as indicated by the arrows 73. This will permit the charging cradle 48 to be able to accommodate handsets 50 with different widths. The centering pads (70, 72) also help to secure the handset 50 in the charging cradle 48.

Figure 6:
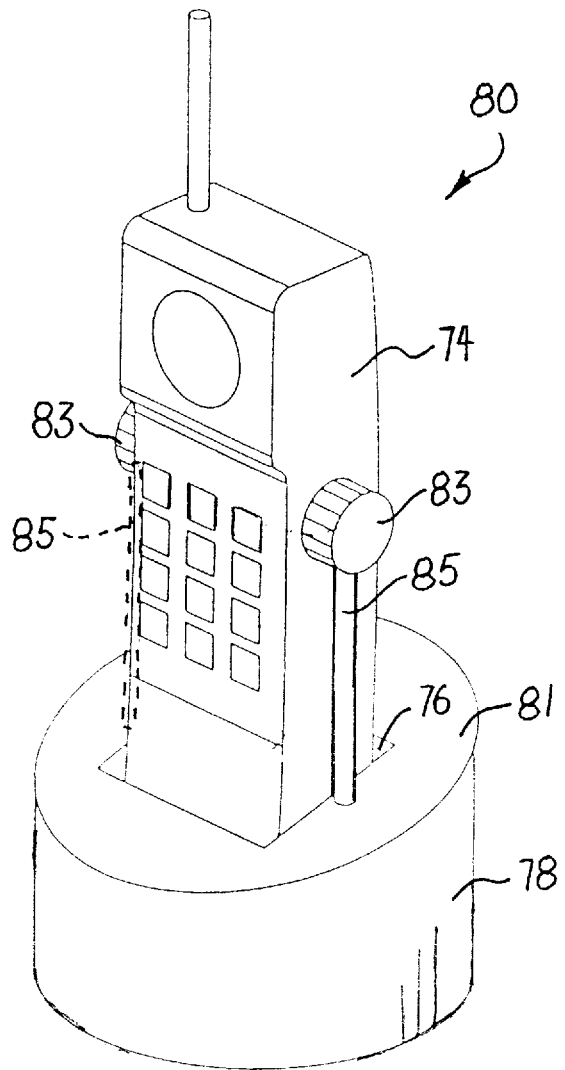
FIG. 6 is a perspective view of a third embodiment of the telephone charging cradle.

FIG. 6 show yet another alternative embodiment of the invention. A cordless telephone handset 74 is located in a central aperture 76 located in the base housing 78 of the charging cradle 80. The base housing 78 houses the charging electronics and may be placed on any convenient surface. The base housing 78 has a top 81 which may or may not be inclined. A pair of centering pads 83 hold the handset 74 securely in the aperture 76 and may also include electrical contacts for charging a handset 74 to support the recharging of handsets with side handset recharging electrodes. The centering pads 83 have posts depending therefrom, placing the electrodes in communication with the charging electronics. It is appreciated that many different housing configurations are possible, as well as different constructions for contact pads.

Figure 7:
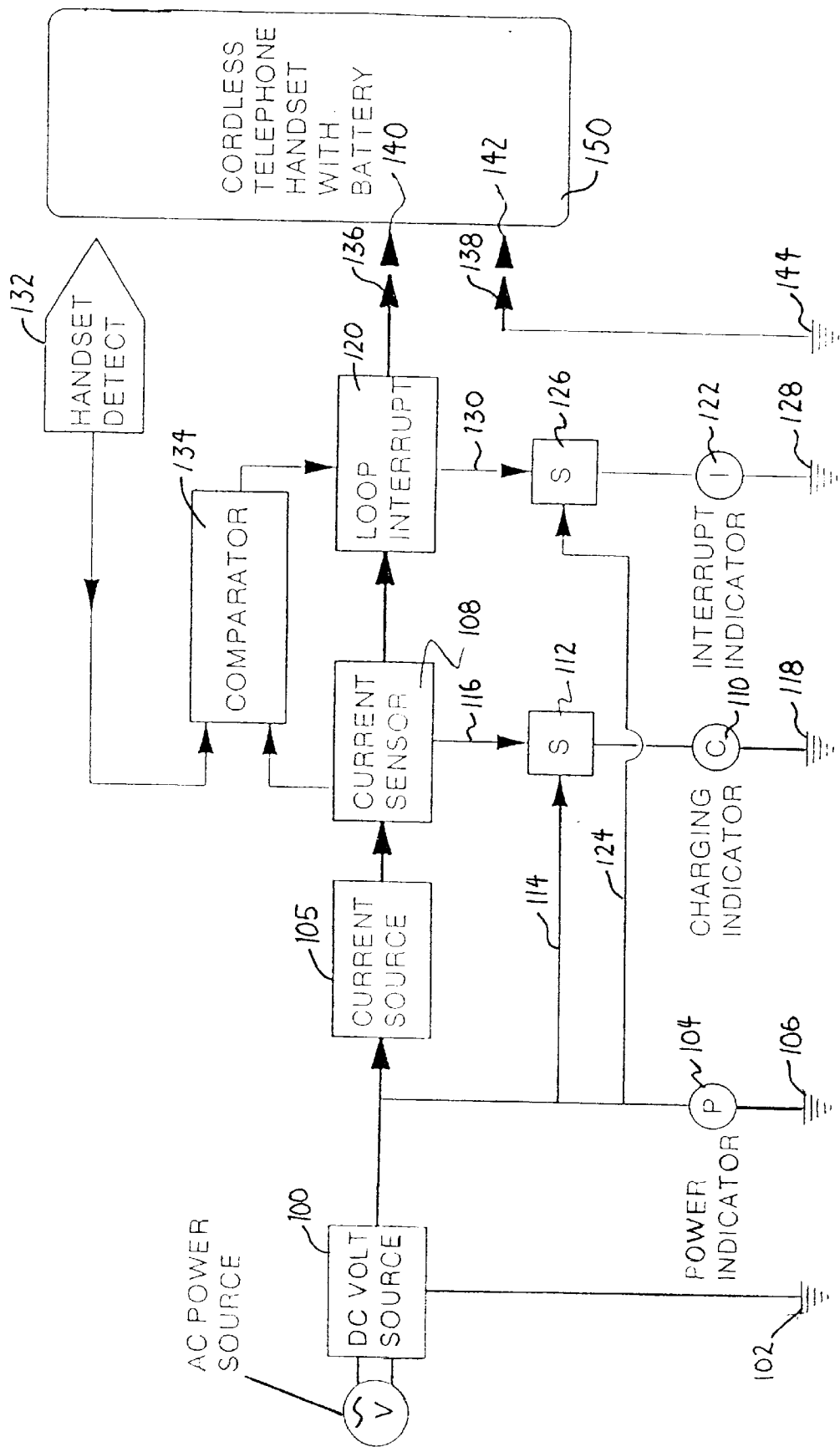
FIG. 7 is a block diagram describing the circuit logic and safety elements.

FIG. 7 is a block diagram describing the general charging circuit elements present in the charging cradle. The DC voltage source 100 is present which provides low voltage DC to the current source 105. The DC supply may be a large capacity battery or a AC driven converter such as a plug-in transformer assembly or other known DC voltage supplier. The operating voltages may range from 3–12 volts and from 10–500 milliamps in the preferred embodiment. The DC voltage source 100 is shown as grounded by a first ground 102. A power indicator 104 gives a visible indication that voltage is available to the current source 105. The power indicator 104 may be a lamp, such as an LED, or a more sophisticated graphical display, such as a meter, flat panel display or LCD. The power indicator 104 is shown as grounded by a second ground 106. The current source 105 is an electronic circuit which produces a constant and controlled current. The current source 105 may be a commercially available integrated circuit (IC) designed for this function or may be constructed from discrete components. The current source 105 may deliver a current in the range of 5–200 milliamps. The current sensor 108 is an electronic circuit that produces a signal relating to the current passing through a sensor. The output signal from the current sensor 108 may be digital or analog. The output signal may be may be proportional to the current of simply present a state change (step-change) if the current exceeds some preset value. The current sensor 108 may be a commercially available integrated circuit (IC) designed for this sensing function or may be constructed from discrete components. The charging indicator 110 gives a visible indication that the current is being supplied by the current source 105. The charging indicator 110 may be a lamp, such as an LED, or a more sophisticated graphical display, such as a meter, flat panel display or LCD. As shown in line 114 the charging indicator 110 is provided with power directly from the DC voltage source 100. The charging indicator 110 is controlled by a signal 116 from the current sensor 108 that acts on a first electronic switch 112. The charging indicator 110 is shown as grounded by a third ground 118. The loop interrupt 120 is an electronic circuit or electromechanical device which interrupts current flow in response to excess current conditions or to an external control signal, such as a signal from the handset detect sensor 132. The loop interrupt 120 may be electronic, such as a commercially available integrated circuit (IC) designed for this interrupt function or may be constructed from discrete components. Alternatively, the loop interrupt 120 may be electromechanical, chosen from the group comprising circuit breakers, fuses or other related devices. The interrupt indicator 122 gives a visible indication that the loop interrupt circuit 120 has been activated. This occurs when the charging electronics have been disconnected from the output electrodes. The interrupt indicator 122 may be a lamp, such as an LED, or a more sophisticated graphical display, such as a meter, flat panel display or LCD. An audible alarm such as a beeper may also be provided. As shown in line 124 the interrupt indicator 122 is provided with power directly from the DC voltage source 100. The interrupt indicator 122 is controlled by a signal 130 from the loop interrupt 120 that acts on a second electronic switch 126. The interrupt indicator 122 is shown as grounded by a fourth ground 128. The handset detect sensor 132 provides a signal depending on the presence or absence of the telephone handset 150 in the charging cradle. This safety feature will permit the disabling of active charging when the handset 150 is not in the cradle or not properly aligned with the charging electrodes. The handset detect sensor 132 may be an electronic circuit or an electromechanical device. Electronic circuits for the handset detect sensor 132 include photoelectric sensors, dielectric sensors or other electronic sensor means. Electro-mechanical sensors for the handset detect sensor 132 include the broad class of mechanically actuated switches. The comparator 134 controls the loop interrupt circuit 120. It receives and compares signals from the current sensor 108 and from the handset detect sensor 132. A control signal to cease or continue charging is generated based on the outcome of the signal comparison. Charging will be interrupted when no handset 150 is present or if there is an abnormally high current. Normal charging of the batteries located within the handset 150 occurs when the charging element 136 and the charging contact 140 (located externally on the telephone handset 150) and the ground element 138 and the ground contact 142 (located externally on the telephone handset 150) come in contact and complete the charging circuit. The ground element 138 is shown being grounded by a fifth ground 144. The above circuit logic would permit the cordless telephone to function normally while undergoing stand alone charging in the cradle.

Figure 8:
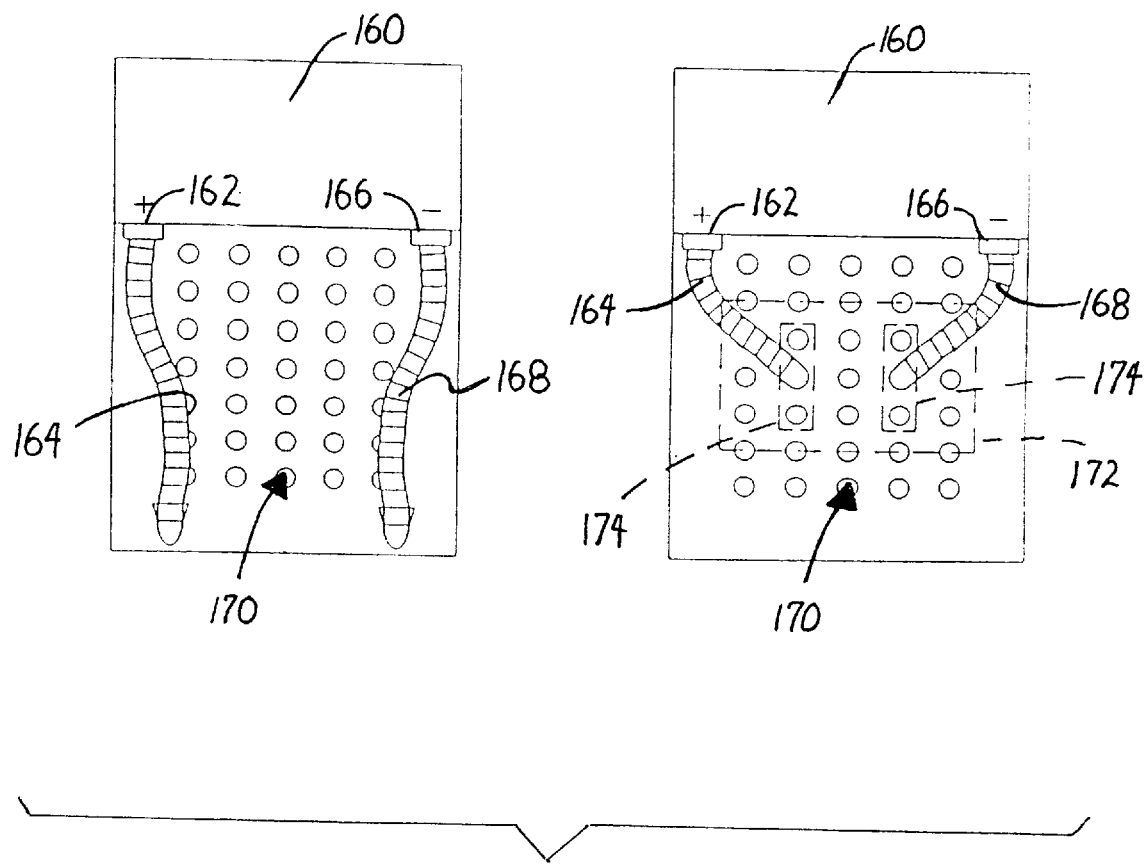
FIG. 8 is a view of the adjustable electrical contacts located in the support elements.

FIG. 8 shows the lead/plug elements of the electrical contacts located in the interchangeable support elements, or in the base of cradle. Different telephone handsets have their external recharging elements located at different orientations and with different spacings between them. As such, it will be useful to provide this means to adjust the specific arrangements of the charging electrical contacts located on the cradle. The battery charging electronics housing 160 is shown having a positive terminal 162 which has a resilient, flexible, elongated lead 164 depending therefrom. A negative terminal 166 is also shown having a second, resilient, flexible, elongated lead 168 depending therefrom. A battery terminal grid 170 is shown as a lattice of apertures, the apertures being sized to snugly receive leads (164, 168). The handset outline 172 is shown with the two external charging terminals 174. The apertures that the leads (164, 168) are placed through are chosen to bring the leads and terminals into contact to permit recharging. Any apertures may be chosen to bring the leads into contact with terminals which have different spacings between them.

Figure 9:
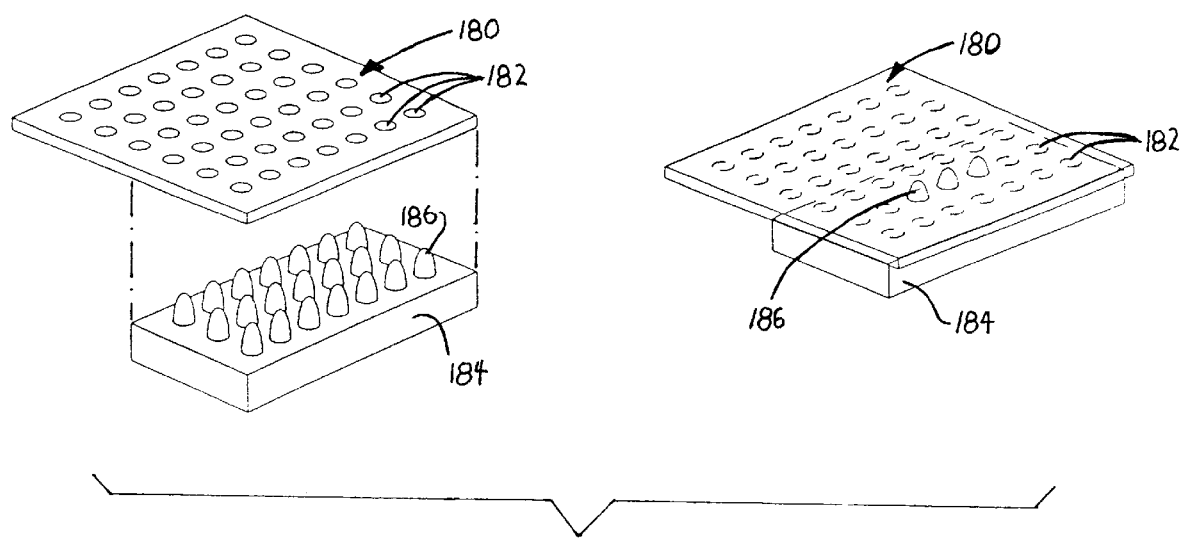
FIG. 9 is a view of the template based contact pad array.

FIG. 9 shows the template based contact pad array. The battery contact grid 180 has a plurality of generally circular punch out elements 182. The punch out elements 182 have perforations located about their perimeters to permit the central element to be easily removed, leaving an aperture. During the setup of the cradle, the external charging elements on the handset will be measured, and an appropriate matching pattern will punched out of grid 180. A substrate 184 is provided with a plurality of spring loaded contact pins 186. When the substrate 184 is brought into mating engagement with the grid 180, only the spring loaded contact pins 186 will be permitted to pass therethrough. This gives a correct pin 186 configuration to charge the handset.

It is apparent from the above that the present invention accomplishes all of the objectives set forth by providing a new universal charging cradle which has interchangeable components which facilitate bringing the charging elements in the charging cradle into contact with the external charging elements located on the cordless telephone handset.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

We claim:

1. A charging cradle for a cordless telephone having external charging elements comprising:

a base, said base having a front section and a rear section, said base including an electrical charging unit, a first support element, said first support element attached to said front section, said first support section having a first pair of electrical contacts, said first pair of electrical elements in communication with said electrical charging unit, a second support element, said second support element attached to said rear section, an elongated element, said elongated element attached to said second support element, said elongated element further having a distal end, a third support element, said third support element attached to said distal end, wherein the cordless telephone rests in said cradle formed by said first support element, said second support element and said third support element, with the cordless telephone's charging elements in contact with said first pair of electrical contacts, permitting the cordless telephone to be recharged.

2. A charging cradle for a cordless telephone as claimed in claim 1 wherein said third support element includes a pair of retaining ears, said ears retaining the cordless telephone in said cradle.

3. A charging cradle for a cordless telephone as claimed in claim 2 wherein said first support element, said second support element, and said third support element are detachable from and interchangeable between said front section, said rear section and said distal end.

4. A charging cradle for a cordless telephone as claimed in claim 3 wherein said first support element, said second support element and said third support element maintain communication with said electrical charging unit when attached to said front section, said middle section or said distal end, said communication effected through electrical wires.

5. A charging cradle for a cordless telephone as claimed in claim 3, which further includes a pair of charging pads with rod attachment elements, said rod attachment elements to be received in said third support element, bringing said charging pads into communication with said charging unit, said communication effected through electrical wires.

6. A cradle assembly for charging the batteries of a cordless telephone, the telephone having external charging elements located on a handset, comprising:

a base, said base having a front section and a rear section, said base housing an electrical charging unit, said front section having a first connection means, said rear section having a second connection means, a first support element, said first support element attached to said first connection means, said first support section having a first pair of electrical contacts, said first pair of electrical elements in communication with said electrical charging unit, a second support element, said second support element attached to said second connection means, an elongated element, said elongated element attached to said second support element, said elongated element having a distal end, said distal end having a third connection means, a third support element, said third support element attached to said third connection means, wherein the cordless telephone rests in said cradle formed by said first support element, said second support element and said third support element, with the cordless telephone's charging elements in contact with said first pair of electrical contacts, permitting the cordless telephone to be recharged.

7. A cradle assembly for charging the batteries of a cordless telephone as claimed in claim 6 wherein said third support element has a pair of ears extended therefrom, said ears to receive the handset.

8. A cradle assembly for charging the batteries of a cordless telephone as claimed in claim 6 wherein said first support element, said second support element, and said third support element are detachable from and interchangeable between said front section, said rear section and said distal end.

9. A reconfigurable charging cradle for a cordless telephone having external charging elements comprising:

a base, said base having a front section and a rear section, said base including an electrical charging unit, a first support element, said first support element removably attached to said front section, said first support section having a first pair of electrical contacts, said first pair of electrical elements in communication with said electrical charging unit, a second support element, said second support element removably attached to said rear section, an elongated element, said elongated element attached to said second support element, said elongated element having a distal end, a third support element, said third support element removably attached to said distal end, wherein the cordless telephone rests in said cradle formed by said first support element, said second support element and said third support element, and where said first support element, said second support element and said third support element are interchangeable in order to reconfigure said cradle in order to bring said first pair of electrical contacts into contact with the cordless telephone's charging elements regardless of the elements location on the telephone, permitting the telephone to be recharged.

10. A reconfigurable charging cradle for a cordless telephone as claimed in claim 9 wherein said third support element includes a pair of retaining ears, said ears retaining the cordless telephone in said cradle.

11. A reconfigurable charging cradle for a cordless telephone as claimed in claim 10 wherein said ears include charging contacts, said charging contacts electrically connected to said electrical charging unit, to enable recharging of a cordless telephone with side contacts.

12. A reconfigurable charging cradle for a cordless telephone as claimed in claim 9 wherein said electrical charging unit may provide a current preferably of about 5 to 500 milliamperes.

13. A reconfigurable charging cradle for a cordless telephone as claimed in claim 12 wherein said electrical charging unit includes a sensor, said sensor detecting the presence of the cordless telephone in said cradle, said electrical charging means being disabled in the absence of the cordless telephone.

14. A reconfigurable charging cradle for a cordless telephone having external charging elements comprising:

a base, said base having a front section, middle section, and a rear section, said base including an electrical charging unit, a first support element, said first support element removably attached to said front section, said first support section having a first pair of electrical contacts, said first pair of electrical elements in communication with said electrical charging unit, a second support element, said second support element removably attached to said middle section, an elongated element, said elongated element attached to said rear section, said elongated element having a distal end, a third support element, said third support element removably attached to said distal end, wherein the cordless telephone rests in said cradle formed by said first support element, said second support element and said third support element, and where said first support element, said second support element and said third support element are interchangeable in order to reconfigure said cradle in order to bring said first pair of electrical contacts into contact with the cordless telephone's charging elements regardless of the elements location on the telephone, permitting the telephone to be recharged.

15. A reconfigurable charging cradle for a cordless telephone as claimed in claim 14 wherein said third support element includes a pair of retaining ears, said ears retaining the cordless telephone in said cradle.

16. A reconfigurable charging cradle for a cordless telephone as claimed in claim 15 wherein said ears include charging contacts, said charging contacts electrically connected to said electrical charging unit, to enable recharging of a cordless telephone with side contacts.

17. A charging cradle for a cordless telephone having external charging elements comprising:

a base, said base having an aperture for receiving said cordless telephone, said base including a top surface, said base further housing an electrical charging unit, said aperture having a bottom surface, said bottom surface having a first pair of electrical contacts, said first pair of electrical elements in communication with said electrical charging unit, a support element, said support element attached to said top surface, said support element including a pair of ears comprising a second pair of electrical contacts in communication with said electrical charging unit, said ears retaining the cordless telephone in said cradle, wherein the cordless telephone rests in said cradle with the cordless telephone's charging elements in contact with one of said first pair of electrical contacts, or said second pair of electrical contacts, permitting the cordless telephone to be recharged.

18. A charging cradle for a cordless telephone as claimed in claim 17 wherein said support element includes a pair of elongated rods, said rods further including electrical communication means, said rods being electrically connected to said electrical charging unit by being plugged into said top surface.

19. A charging cradle for a cordless telephone as claimed in claim 18 wherein said base is cylindrical.

* * * * *